United States Patent
Bono et al.

(10) Patent No.: US 10,013,217 B1
(45) Date of Patent: Jul. 3, 2018

(54) UPPER DECK FILE SYSTEM SHRINK FOR DIRECTLY AND THINLY PROVISIONED LOWER DECK FILE SYSTEM IN WHICH UPPER DECK FILE SYSTEM IS STORED IN A VOLUME FILE WITHIN LOWER DECK FILE SYSTEM WHERE BOTH UPPER DECK FILE SYSTEM AND LOWER DECK FILE SYSTEM RESIDES IN STORAGE PROCESSOR MEMORY

(71) Applicant: EMC Corporation, Hopkinton, MA (US)

(72) Inventors: Jean-Pierre Bono, Westborough, MA (US); William C. Davenport, Burlington, MA (US); Miles A. de Forest, Bahama, NC (US); Walter C. Forrester, Berkeley Heights, NJ (US); Michal Marko, Fanwood, NJ (US); Alexander Mathews, Jamesburg, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 405 days.

(21) Appl. No.: 13/929,879

(22) Filed: Jun. 28, 2013

(51) Int. Cl.
*G06F 3/06* (2006.01)

(52) U.S. Cl.
CPC .......... *G06F 3/0689* (2013.01); *G06F 3/0626* (2013.01); *G06F 3/0647* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,675,769 A | * | 10/1997 | Ruff ...................... | G06F 3/0607 711/112 |
| 6,253,300 B1 | * | 6/2001 | Lawrence ............. | G06F 3/0611 711/112 |
| 6,330,653 B1 | * | 12/2001 | Murray ................. | G06F 3/0605 707/E17.01 |
| 6,487,563 B1 | | 11/2002 | Houldsworth | |

(Continued)

OTHER PUBLICATIONS

Filesystems. Guide [online]. Linux, May 22, 2012 [retrieved on May 18, 2016]. Retrieved from the Internet <https://web.archive.org/web/20120522092055/http://tldp.org/LDP/sag/html/filesystems.html>.*

(Continued)

*Primary Examiner* — Ann J Lo
*Assistant Examiner* — Chie Yew
(74) *Attorney, Agent, or Firm* — BainwoodHuang (57) ABSTRACT

An improved technique involves providing file system shrink capability by shrinking the size of the volume file in which an upper deck file system is stored. Along these lines, a data storage system, upon receiving a request to shrink an upper deck file system, determines a new address in the upper deck file system, based on an amount the upper deck file system is to be shrunk, to which the end-of-file (EOF) pointer of the volume file will point. The new address will have a smaller distance from the address of the file pointer than the original address to which the EOF pointer points. The data storage system then identifies nonempty data blocks of the upper deck file system that have logical addresses having a larger distance from the address of the file pointer than the second logical address.

20 Claims, 4 Drawing Sheets

(56) References Cited

U.S. PATENT DOCUMENTS

| | | |
|---|---|---|
| 7,254,685 B1 | 8/2007 | Cardente |
| 7,631,155 B1 | 12/2009 | Bono et al. |
| 8,140,814 B2 | 3/2012 | Agombar et al. |
| 8,433,869 B1 | 4/2013 | Natanzon et al. |
| 8,793,290 B1* | 7/2014 | Pruthi et al. ............... 707/821 |
| 2002/0091903 A1* | 7/2002 | Mizuno ............... G06F 3/0605 711/154 |
| 2003/0115218 A1* | 6/2003 | Bobbitt ............ G06F 17/30233 |
| 2004/0030822 A1* | 2/2004 | Rajan ................... G06F 3/0605 711/4 |
| 2004/0205289 A1 | 10/2004 | Srinivasan |
| 2004/0243612 A1* | 12/2004 | Bailey ........................... 707/101 |
| 2004/0254907 A1* | 12/2004 | Crow ............... G06F 17/30067 |
| 2005/0055492 A1* | 3/2005 | Muthulingam et al. ...... 711/100 |
| 2006/0101204 A1* | 5/2006 | Bao ....................... G06F 3/0605 711/114 |
| 2007/0143563 A1* | 6/2007 | Pudipeddi et al. ........... 711/173 |
| 2007/0266037 A1* | 11/2007 | Terry ................... G06F 3/0607 |
| 2008/0021693 A1* | 1/2008 | Campbell ............. G06F 11/261 703/21 |
| 2009/0313503 A1 | 12/2009 | Atluri et al. |
| 2010/0082715 A1* | 4/2010 | Dohm ................... G06F 3/0608 707/822 |
| 2012/0072807 A1* | 3/2012 | Cornwell ............ G06F 11/0742 714/773 |
| 2012/0151245 A1* | 6/2012 | Chang ............... G06F 17/30227 714/4.1 |
| 2012/0239896 A1* | 9/2012 | Sobel .................... G06F 3/0608 711/165 |
| 2013/0110790 A1* | 5/2013 | Matsumoto ............. G06F 12/00 707/679 |
| 2013/0111103 A1* | 5/2013 | Dodson et al. ............... 711/103 |

OTHER PUBLICATIONS

Thick Provision. Article [online]. ITPRo Windows, Jul. 6, 2010 [retrieved on May 23, 2016]. Retrieved from the Internet <http://windowsitpro.com/virtualization/q-whats-difference-between-thick-provisioned-and-thin-provisioned-disks-esx-40>.*

Bono, "Unified Datapath Architecture," U.S. Appl. No. 13/828,322, filed Mar. 14, 2013.
Bono, et al., "Unified Datapath Processing With Virtualized Storage Processors," U.S. Appl. No. 13/828,294, filed Mar. 14, 2013.
Bono, et al., "Providing Multi-Tenancy Within a Data Storage Apparatus," U.S. Appl. No. 13/837,869, filed Mar. 15, 2013.
Bono, et al., "Unified Data Protection for Block and File Objects," U.S. Appl. No. 13/853,508, filed Mar. 29, 2013.
Bono, et al., "File System Inline Fine Grained Tiering," U.S. Appl. No. 13/928,591, filed Jun. 27, 2013.
Bono, et al., "Efficient Scavenging of Data and Metadata File System Blocks," U.S. Appl. No. 13/929,887, filed Jun. 28, 2013.
Bono, et al., "Data Storage System With Unified System Cache," U.S. Appl. No. 13/930,164, filed Jun. 28, 2013.
Bono, et al., "Unified Data Services for Block and File Objects," U.S. Appl. No. 13/853,284, filed Mar. 29, 2013.
Bono, et al., "File System Over Fully Provisioned Volume File in Direct Mode," U.S. Appl. No. 13/931,757, filed Jun. 28, 2013.
Bono, et al., "File System Snapshots Over Fully Provisioned Volume File in Direct Mode," U.S. Appl. No. 13/931,764, filed Jun. 28, 2013.
Bono, et al., "File System Over Thinly Provisioned Volume File in Mapped Mode," U.S. Appl. No. 13/931,769, filed Jun. 28, 2013.
Bono, et al., "File System Snapshots Over Thinly Provisioned Volume File in Mapped Mode," U.S. Appl. No. 13/931,775, filed Jun. 28, 2013.
Bono, et al., "Transaction Logging Using File-System-Specific Log Files," U.S. Appl. No. 14/230,831, filed Mar. 31, 2014.
Bono, et al., "Techniques for Providing Access to a Virtualized Block Storage Device Over a File-Based Network Storage Protocol," U.S. Appl. No. 14/319,739, filed Jun. 30, 2014.
Bono, et al., "Auxiliary Files in a Container File System," U.S. Appl. No. 14/319,634, filed Jun. 30, 2014.
Bono, et al., "Reclaiming Space From File System Hosting Many Primary Storage Objects and Their Snapshots," U.S. Appl. No. 14/319,455, filed Jun. 30, 2014.
Bono, et al., "File System Version Set Infrastructure," U.S. Appl. No. 14/319,602, filed Jun. 30, 2014.
Bono, et al., "Proactive Scavenging of the File System Snaps," U.S. Appl. No. 14/319,660, filed Jun. 30, 2014.

* cited by examiner

UPPER DECK FILE SYSTEM SHRINK FOR DIRECTLY AND THINLY PROVISIONED LOWER DECK FILE SYSTEM IN WHICH UPPER DECK FILE SYSTEM IS STORED IN A VOLUME FILE WITHIN LOWER DECK FILE SYSTEM WHERE BOTH UPPER DECK FILE SYSTEM AND LOWER DECK FILE SYSTEM RESIDES IN STORAGE PROCESSOR MEMORY

BACKGROUND

Data storage systems typically store the data and metadata of file systems in blocks of storage. For example, the file data constituting files in a file system are stored in blocks of storage, as are inodes, indirect blocks, and other metadata. Data storage systems may also provision storage to file systems in units of fixed size, known as "slices." Data storage systems generate slices, for example, from one or more physical storage devices, such as RAID groups of physical storage devices.

Some conventional data storage systems provide thick provisioning of storage resources. Such data storage systems allocate a specified amount of physical storage space to a file system. In thick provisioning, allocated slices occupy all of an address space of a file system.

Other data storage systems provide thin provisioning of storage resources. In thin provisioning, a file system typically has a very large address space but is allocated specific storage slices to populate the file system only as storage is needed to satisfy write requests. Thus, in thin provisioning, a file system may have an address space that is measured in petabytes but may be allocated slices to occupy only a small fraction of the address space.

SUMMARY

In some arrangements, it is desirable to perform a shrink operation on a file system, i.e., return a portion of its available storage space to a storage pool. Along these lines, suppose that a file system is provisioned 100 terabytes (TB) of storage space, which is eventually filled with data. Suppose further that, at some point later, a user of the file system deletes 20 TB of data because that data was migrated elsewhere. Suppose still further that the 20 TB of storage space is never used again after the migration. In this case, the data storage system may remove the 20 TB of storage space from the file system so that the space can be available to another file system.

In thin provisioning, there are options for performing shrink operations on file systems. One such shrink operation involves using statistics maintained in a slice map to determine which provisioned slice should be selected to have its blocks deallocated, transferring of blocks of data from those slices to other slices, and returning the now-empty slices to the storage pool.

Unfortunately, a deficiency of the above-described conventional data storage systems is that, in thick provisioning, no such an option is available. Because all of the slices in a directly provisioned file system are filled with blocks of allocated storage, there are no slices to which blocks of data may be transferred.

In the context of the current discussion, it should be understood that some data storage systems may employ an architecture in which an "upper deck file system" accessible to hosts is stored in the form of a volume file in a "lower deck file system." The upper deck file system includes logical blocks of data that have a contiguous address space defined by offsets from the address of the volume file in the lower deck file system. For direct provisioning, a data storage system associates a logical block of data in the upper deck file system with an actual block of data provisioned to the lower deck file system. For thin provisioning, on the other hand, only when a host writes data to a logical block in the upper deck file system does the storage system allocate an actual block of data provisioned to the lower deck file system for that logical block.

In contrast to the above-described conventional data storage systems which provide no facility for shrinking upper deck file systems using thick provisioning of storage resources, an improved technique involves providing file system shrink capability by shrinking the size of the volume file in which an upper deck file system is stored. Along these lines, a data storage system, upon receiving a request to shrink an upper deck file system, determines a new address in the upper deck file system, based on an amount the upper deck file system is to be shrunk, to which the end-of-file (EOF) pointer of the volume file will point. The new address will have a smaller distance from the address of the file pointer than the original address to which the EOF pointer points. The data storage system then identifies nonempty data blocks of the upper deck file system that have logical addresses having a larger distance from the address of the file pointer than the second logical address. The data storage system moves these nonempty data blocks to logical addresses having a smaller distance from the address of the file pointer than the second logical address. The data storage system moves the EOF pointer of the volume file to the new address to complete the shrinking of the upper deck file system.

Advantageously, the improved technique provides for a common file system shrink facility for both thinly and directly provisioned upper deck file systems. In this way, the shrink capability removes a barrier to using directly provisioned file systems. Further, it provides an additional technique for performing file system shrink for thinly provisioned file systems.

One embodiment of the improved technique is directed to a method of managing storage space in an upper deck file system stored in a volume file in an underlying lower deck file system, the volume file having a file pointer pointing to an initial logical address in the upper deck file system and an end-of-file (EOF) pointer pointing to a first logical address in the upper deck file system. The method includes receiving a request to perform a file system shrink operation on the upper deck file system. The method also includes generating a second logical address in the upper deck file system, the second logical address having a smaller distance from the initial logical address than the first logical address in response to receipt of the request. The method further includes identifying nonempty data blocks of the upper deck file system that have logical addresses having a larger distance from the initial logical address than the second logical address. The method further includes moving the identified nonempty data blocks of the upper deck file system to logical addresses having a smaller distance from the initial logical address than the first logical address. The method further includes moving the EOF pointer of the volume file to point to the second logical address.

Additionally, some embodiments of the improved technique are directed to a data storage apparatus constructed and arranged to manage storage space in an upper deck file system stored in a volume file in an underlying lower deck file system. The data storage apparatus includes a set of storage devices and a storage processor. The storage processor includes memory and a set of processors coupled to the memory to form controlling circuitry. The controlling circuitry is constructed and arranged to carry out the method of managing storage space in an upper deck file system stored in a volume file in an underlying lower deck file system.

Furthermore, some embodiments of the improved technique are directed to a computer program product having a non-transitory computer readable storage medium which stores code including a set of instructions which, when executed by a computer, cause the computer to carry out the method of managing storage space in an upper deck file system stored in a volume file in an underlying lower deck file system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves providing file system shrink capability by shrinking the size of the volume file in which an upper deck file system is stored. Along these lines, a data storage system, upon receiving a request to shrink an upper deck file system, determines a new address in the upper deck file system, based on an amount the upper deck file system is to be shrunk, to which the end-of-file (EOF) pointer of the volume file will point. The new address will have a smaller distance from the address of the file pointer than the original address to which the EOF pointer points. The data storage system then identifies nonempty data blocks of the upper deck file system that have logical addresses having a larger distance from the address of the file pointer than the second logical address. The data storage system moves these nonempty data blocks to logical addresses having a smaller distance from the address of the file pointer than the second logical address. The data storage system moves the EOF pointer of the volume file to the new address to complete the shrinking of the upper deck file system.

Advantageously, the improved technique provides for a common file system shrink facility for both thinly and directly provisioned upper deck file systems. In this way, the shrink capability removes a barrier to using directly provisioned file systems. Further, it provides an additional technique for performing file system shrink for thinly provisioned file systems.

Figure 1:
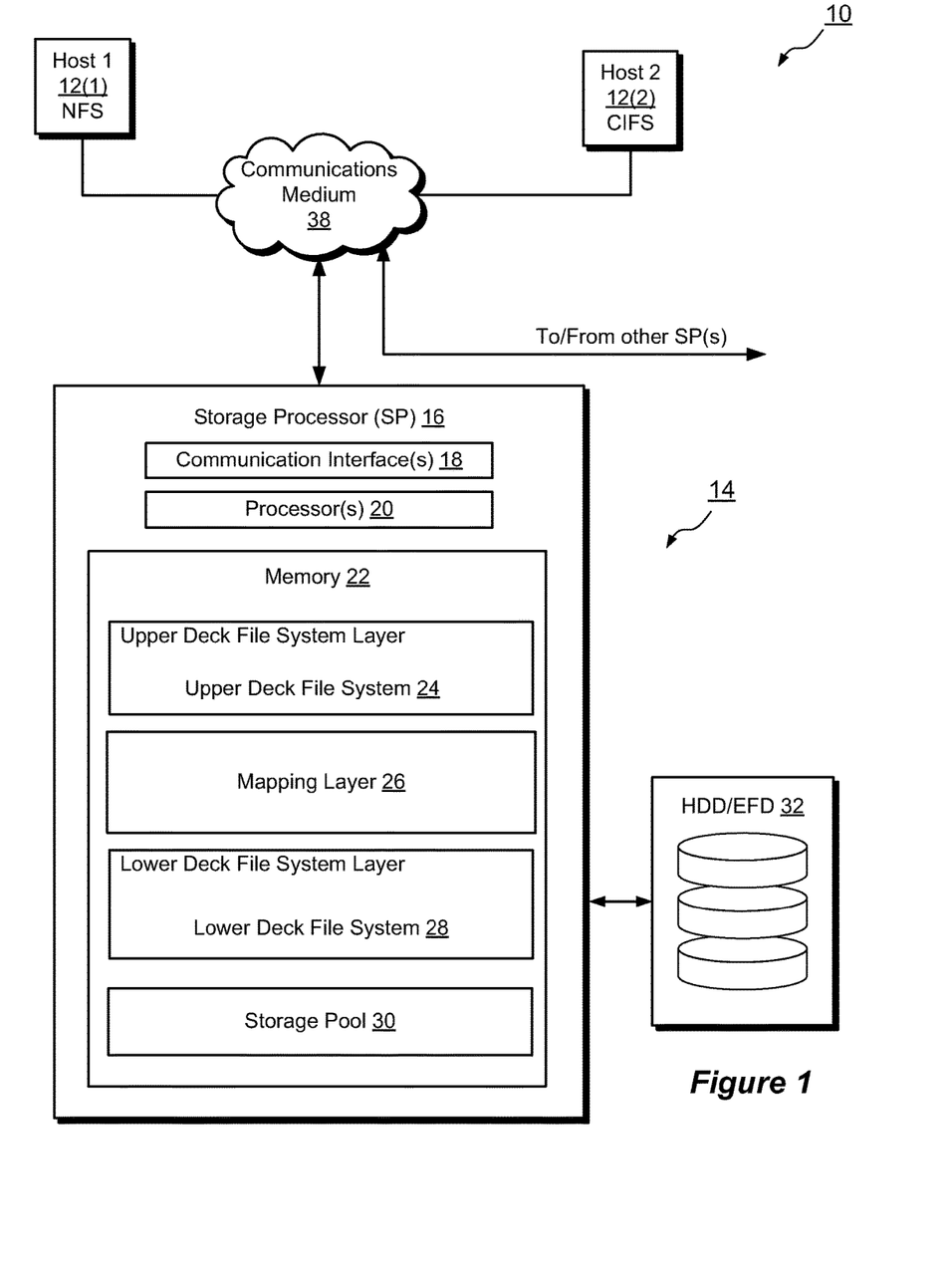
FIG. 1 is a block diagram illustrating an example electronic environment for carrying out the improved technique.

FIG. 1 illustrates an example electronic environment 10 for which the improved technique is carried out. Electronic environment 10 includes hosts 12(1) and 12(2), communications medium 38, and data storage system 14 which in turn includes storage processor 16 and storage devices 32. Storage devices 32 are provided, for example, in the form of hard disk drives and/or electronic flash drives (EFDs). Data storage system 14 may include multiple storage processors like storage processor 16. For instance, multiple storage processors may be provided as circuit board assemblies, or "blades," which plug into a chassis that encloses and cools the storage processors. The chassis has a backplane for interconnecting the storage processors, and additional connections may be made among storage processors using cables. It should be understood, however, that no particular hardware configuration is required, as any number of storage processors (including a single one) can be provided and storage processor 16 can be any type of computing device.

Communications medium 38 can be any type of network or combination of networks, such as a storage area network (SAN), local area network (LAN), wide area network (WAN), the Internet, and/or some other type of network, for example. In an example, hosts 12(1) and 12(2) connect to storage processor 16 using various technologies. For example, host 12(1) can connect to the storage processor 16 using NFS (e.g., through a SAN), while host 12(2) can connect to the storage processor 16 using CIFS. Any number of hosts (not pictured) may be provided, using any of the above protocols, some subset thereof, or other protocols besides those shown. As is known, Fibre Channel and iSCSI are block-based protocols, whereas NFS, SMB 3.0, and CIFS are file-based protocols. Storage processor 16 is configured to receive IO requests according to both block-based and file-based protocols and to respond to such IO requests by reading or writing storage device 18.

Hosts 12(1) and 12(2) may be configured to send IO requests to storage processor 16 via communications medium 18. In some arrangements, hosts 12(1) and 12(2) are desktop computers; in other arrangements, hosts 12(1) and 12(2) can each be a server, a laptop computer, a tablet computer, or any other electronic device having a processor capable of issuing requests.

Storage processor 16 is seen to include a communication interface 18, a processor 20, and memory 22. Communication interface 18 includes, for example, adapters, such as SCSI target adapters and network interface adapters, for converting electronic and/or optical signals received from the communications medium 38 to electronic form for use by storage processor 16. Processor 20 includes one or more processing chips and/or assemblies. In a particular example, the processor 20 includes numerous multi-core CPUs. Memory 22 includes both volatile memory (e.g., RAM), and non-volatile memory, such as one or more ROMs, disk drives, solid state drives (SSDs), and the like. Processor 20 and memory 22 together form control circuitry, which is constructed and arranged to carry out various methods and functions as described herein. Also, memory 22 includes a variety of software constructs realized in the form of executable instructions. When the executable instructions are run by processor 20, processor 20 is caused to carry out the operations of the software constructs. Although certain software constructs are specifically shown and described, it is understood that memory 22 typically includes many other software constructs, which are not shown, such as various applications, processes, and daemons.

As shown, memory 22 includes an upper deck file system layer containing an upper deck file system 24, a mapping layer 26, a lower deck file system layer containing a lower deck file system 28, and a storage pool 30.

Upper deck file system 24 presents data stored in underlying files for file-based data such as host file systems. For example, there may be an upper deck file system 24 for each host file system stored in a file of the lower-deck file system(s) 28 (described below). Upper-deck file system 24 as shown in FIG. 1 presents files and directories of a host file system to hosts 12(1), even though the host file system is represented internally as a file. Upper deck file system 24 may be either directly or thinly provisioned.

Mapping layer 26 maps host objects as presented in upper deck file system 24 to corresponding underlying files stored in one or more lower-deck file systems 28. For host file systems, mapping layer 26 converts a given file or directory represented in an upper deck file system of upper deck file system 24 to a particular file in a lower deck file system 28 and to a particular location within the file. For example, in a directly provisioned upper deck file system, storage processor 16 determines a block in the lower deck file system from a block in the upper deck file system through a mapping algorithm. Additionally, in a thinly provisioned upper deck file system, storage processor 16 determines a block in the lower deck file system from a block in the upper deck file system through a traversal of an indirect block tree.

Lower deck file system 28 represents host file systems in the form of files and is directly provisioned. Any number of lower deck file systems 28 may be provided. In one arrangement, a single lower deck file system 28 may be provided to include any number of host file systems, as well as their snaps (i.e., point-in-time copies). In another arrangement, a different lower deck file system is provided for each primary object to be stored, i.e., for each host file system. The lower deck file system for any primary object may include a file storing the object itself, as well as files storing any snaps of the object. Each lower deck file system 28 has an inode table, which provides a unique inode for each file stored in lower-deck file system 28. The inode table of each lower deck file system stores properties of each file in the respective lower deck file system, such as ownership and block locations at which the file's data are stored. Lower deck file systems are built upon storage elements managed by a storage pool 30.

Storage pool 30 organizes elements of the storage 32 in the form of slices. A "slice" is an increment of storage space, such as 256 MB in size, which is drawn from the storage 32. Pool 30 may allocate slices to lower-deck file systems 28 for use in storing their files. Pool 30 may also deallocate slices from lower deck file systems 28 if the storage provided by the slices is no longer required. In an example, the storage pool 30 creates slices by accessing RAID groups formed from storage 32, dividing the RAID groups into FLUs (Flare LUNs), and further dividing the FLU's into slices.

Figure 2:
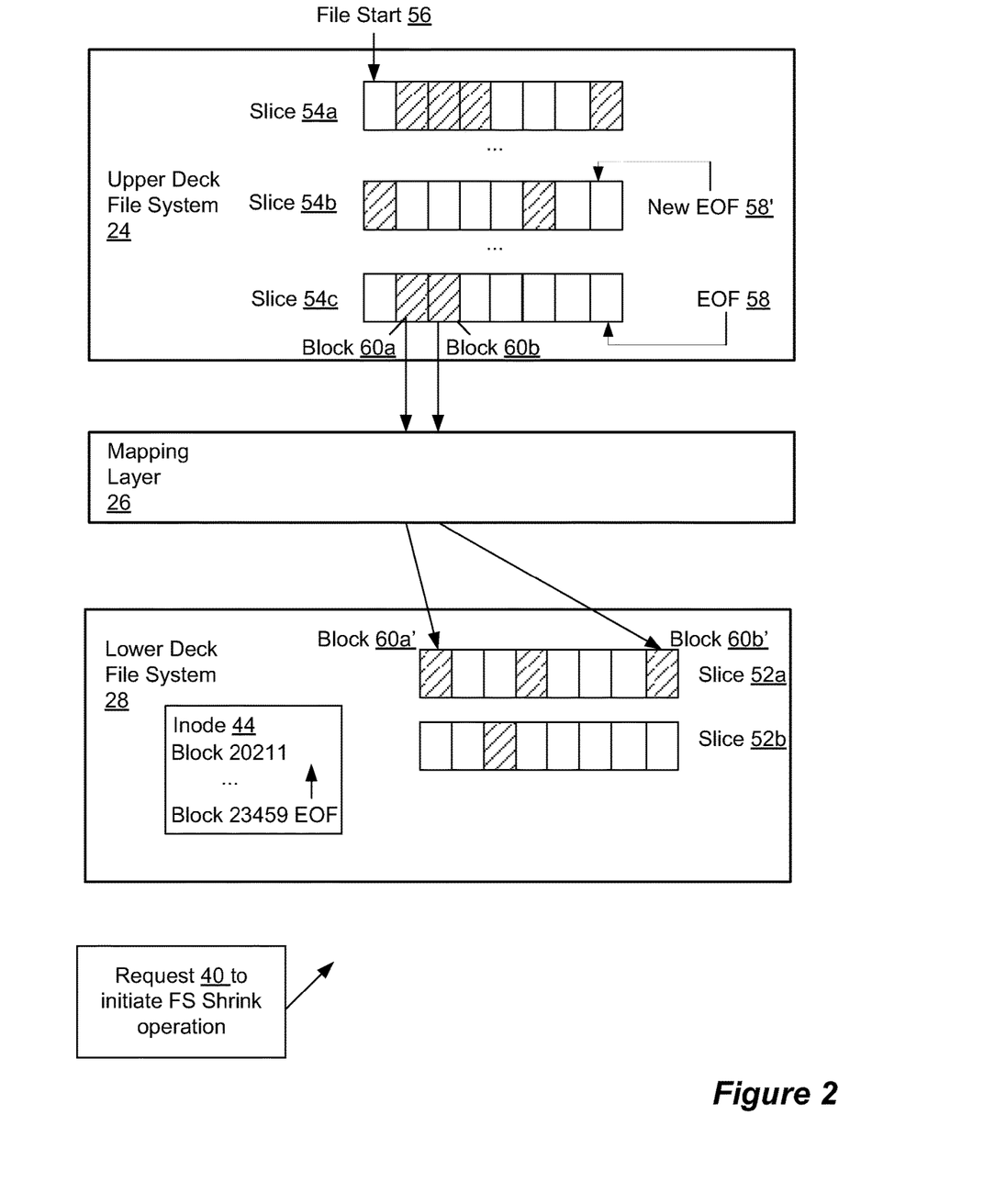
FIG. 2 is a block diagram illustrating an example upper deck file system and lower deck file system within the electronic environment shown in FIG. 1.

Further details of memory 22 are discussed below in connection with FIG. 2. FIG. 2 illustrates further details of example upper deck file system 24, example mapping layer 26, and example lower deck file system 28. Upper deck file system 24 and lower deck file system 28 belong to host 12(1).

For the purposes of discussion below, it will be assumed that upper deck file system 24 is directly provisioned.

Upper deck file system 24 according to FIG. 2 includes slices 54a, 54b, and 54c. Each of slices 54a, 54b, and 54c contains logical blocks including blocks 60a and 60b. Each of the logical blocks in slices 54a, 54b, and 54c has one of two states: empty (i.e., no data), and nonempty (some data written into the data block).

It should be understood that upper deck file system also contains metadata slices (not pictured) which in turn contain blocks of metadata corresponding to a block of data, a slice, or a file. An example of such metadata is a virtual block map (VBM) that provides location information for a block of data.

Lower deck file system 28 according to FIG. 2 includes slices 52a and 52b, each of which are provisioned by storage pool 30 (see FIG. 1) and contain blocks of storage including blocks 60a' and 60b' which provide physical storage for logical blocks 60a and 60, respectively. In lower deck file system 28, blocks in slices 52a and 52b are also in either an empty or a nonempty state.

Lower deck file system 28 also contains metadata slices (not pictured) which contain metadata blocks. One metadata block present in lower deck file system 28 contains inode 44, which is the inode for the volume file storing upper deck file system 28. Inode 44 then contains pointers to blocks of data in storage allocated to upper deck file system 24, and each of these pointers is mapped to an offset from the volume file address. Further, each offset from the volume file address corresponds to a logical address of a block of storage in the upper deck file system. As discussed above, lower deck file system 28 also includes an inode table (not pictured) that provides the location in storage for inode 44.

As illustrated in FIG. 2, inode 44 contains a location for an end-of-file (EOF) pointer for the volume file in the upper deck file system address space. The EOF pointer defines the range of the address space in upper deck file system 28 and thus the amount of storage space allocated to upper deck file system 24. Inode 44 also contains a location for the file pointer that defines the beginning of the volume file in the upper deck file system address space.

During operation, storage processor 16 (see FIG. 1) receives a request 40 to initiate a file system shrink operation. Such a request is typically a manual request from an administrator specifying an amount of storage that is to be taken from upper deck file system 24 so that storage slices may be returned to storage pool 30. For thinly provisioned upper deck file systems 24, however, storage processor 16 may initiate the file system shrink operation in response to the amount of free space in upper deck file system 24 exceeding a threshold, or some other event.

In response to receipt of request 40, storage processor computes a new location for the EOF pointer in the volume file in lower deck file system 28. This new location is a new distance, or offset, from the file address, and as the upper deck file system is being shrunk, this new offset will be smaller than the current value of the offset. In some arrangements, the change in offset corresponds to a whole number of slices in upper deck file system 24 so that upper deck file system 24 may be shrunk in units of slices. In the example illustrated in FIG. 2, the current offset has value 23459; after receiving request 40, storage processor 16 determines the new offset to have value 20211.

It should be understood that the file address of the volume file in lower deck file system 24 determines an address for a file start block 56 in upper deck file system. In the example illustrated in FIG. 2, file start block 56 is at the beginning of slice 54a in anticipation of upper deck file system being allocated and deallocated storage space in units of slices. Accordingly, EOF pointer 58 corresponds to the end of slice 54c in upper deck file system.

Storage processor 16 then determines whether there are blocks in upper deck file system to which data have been written that have addresses corresponding to offsets between the current EOF offset 58 and the computed EOF offset 58' determined by storage processor 16 in response to request 40. In the example illustrated in FIG. 2, blocks 60a and 60b are blocks of data that are located between EOF offset 50 and computed EOF offset 58'. Other blocks, while allocated in the case of upper deck file system 24 being directly provisioned, do not have data written into them so that their loss from a file system shrink operation will not result in any loss of data.

It should be understood that blocks 60*a* and 60*b* each correspond to physical blocks of storage provisioned to lower deck file system 28 as determined algorithmically in the case of a directly provisioned upper deck file system 24. In this case, as illustrated in FIG. 2 and discussed above, mapping layer points to blocks 60*a'* and 60*b'* in lower deck file system 28 that correspond to blocks 60*a* and 60*b* in upper deck file system 24. These mapping between blocks in upper deck file system 24 and lower deck file system 28 are also recorded in inode 44. Also illustrated in FIG. 2 are slices 52*a* and 52*b* in lower deck file system 28 that contained provisioned storage blocks, including blocks 60*a'* and 60*b'*.

After determining which blocks in upper deck file system are between EOF offset 58 and new offset 58' and therefore in need of being evacuated from their current locations in upper deck file system 24, storage processor 16 determines locations for these blocks in between file start 56 and new EOF offset 58'.

In some arrangements, storage processor 16 treats metadata slices in upper deck file system differently from slices of data. For example, storage processor 16 does not evacuate individual blocks of metadata in metadata slices due to potential problems that may arise in maintaining data consistency. Rather, storage processor 16 seeks to relocate metadata slices to a location between file start 56 and new EOF offset 58'. To accomplish this, storage processor finds a metadata slice that contains all empty metadata blocks and swaps this metadata slice with a metadata slice containing active metadata blocks that needs to be moved to a location between file start 56 and new EOF offset 58'.

Figure 3:
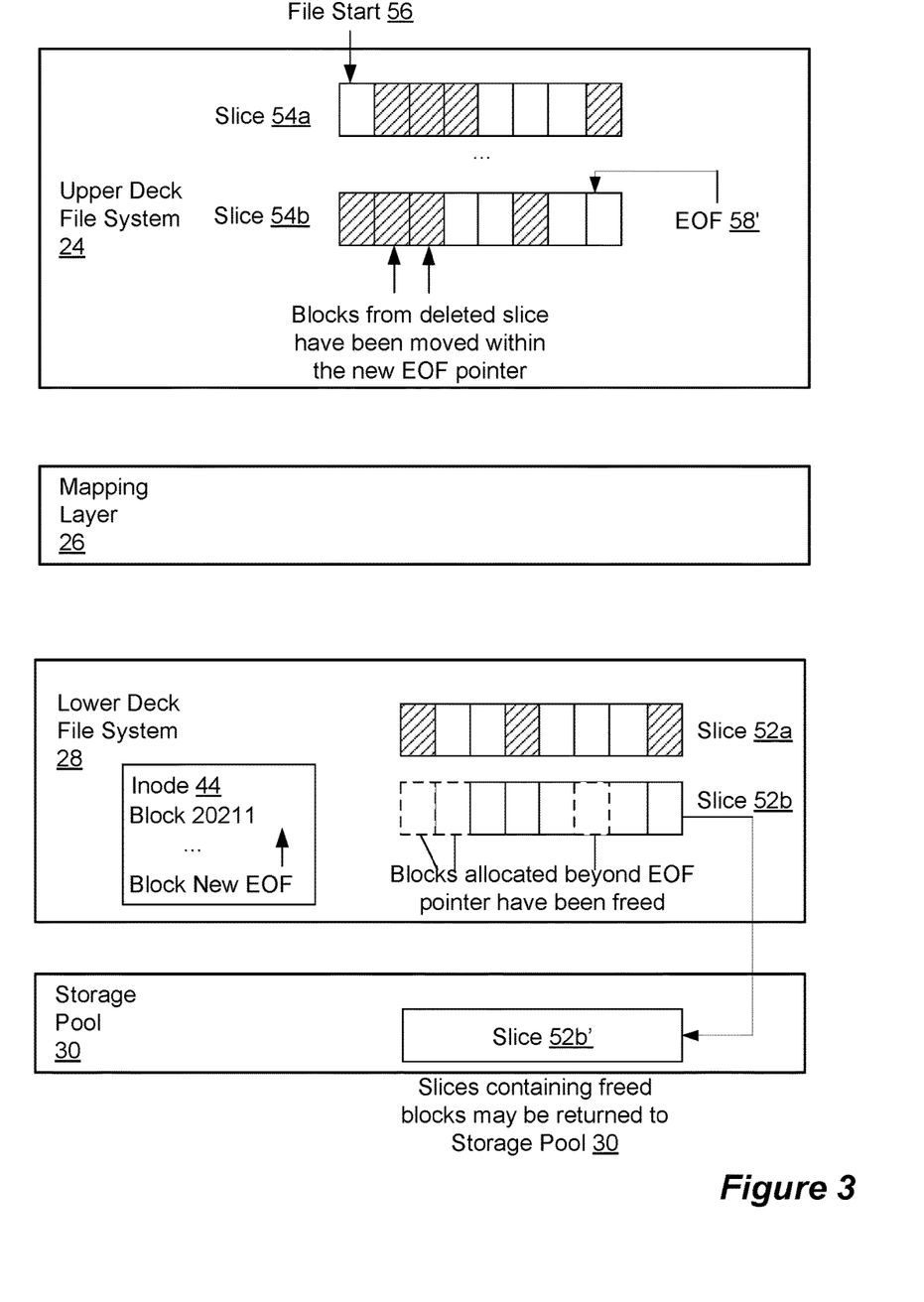
FIG. 3 is a block diagram illustrating an example upper deck file system within the electronic environment shown in FIG. 1.

Storage processor 16 then executes the moves of data blocks and metadata slices derived in the steps described above. The moves of the data blocks are described in detail in connection with FIG. 3. FIG. 3 illustrates upper deck file system 24, mapping layer 26, upper deck file system 28, and storage pool 30.

Continuing the discussion of the operation, FIG. 3 illustrates an upper deck file system that contains only slices 54*a* and 54*b*. EOF pointer 58' still points to the end of slice 54*b*, but now represents the largest offset from the file address. Data from blocks 60*a* and 60*b* have been evacuated and storage processor 16 has placed the data in previously empty blocks within slice 54*b*. (Storage processor 16 could also have placed the data in blocks in slice 54*a* as well, or any other slices in between.) Storage processor 16 then updates inode 44 and mapping layer 26 to reflect the new locations for this data.

With no data remaining in any of its blocks, storage processor 16 may eliminate slice 54*c*—and any other slice that was originally between the old EOF pointer 58 and new EOF pointer 58'—from upper deck file system 24. The effect of this is that storage processor 16 frees blocks of data in lower deck file system 28 that correspond to blocks allocated in upper deck file system that had offsets larger than the offset of the new EOF pointer 58'. In some arrangements, after a threshold amount of storage in the lower deck file system 24 has been freed, storage processor 16 evacuates blocks of data in lower deck file system to selected slices, say, slice 52*a*. Storage processor 16 then returns to storage pool 30 slices such as slice 52*b* that, as a result of the evacuation, has no blocks containing data. Slice 52*b'*, the slice returned to storage pool 30, is now available to be allocated to another lower deck file system.

It should be understood that storage processor 16 treats metadata in the same manner once metadata slices are relocated in the upper deck file system 24. Once a metadata slice has been removed from upper deck file system 24, storage processor 16 frees metadata blocks in lower deck file system 28 from which metadata blocks in that removed slice were allocated. After enough metadata blocks in lower deck file system are freed, storage processor 16 consolidates remaining metadata blocks into selected slices and returns other, empty slices to storage pool 30 for reuse.

It should also be understood that, while the above discussion concerned mainly thick provisioning, the above-described improved technique also applies to thin provisioning. In this case, the main difference is that not all blocks of data in upper deck file system 24 are allocated storage from blocks in lower deck file system 28, and the address space in upper deck file system is sparsely populated. Thus, storage processor may cause lower deck file system 28 to allocate storage blocks to upper deck file system in locations having an offset smaller than new EOF offset 58' so that there are sufficient locations in which to store data blocks from offsets larger than new EOF offset 58'.

Figure 4:
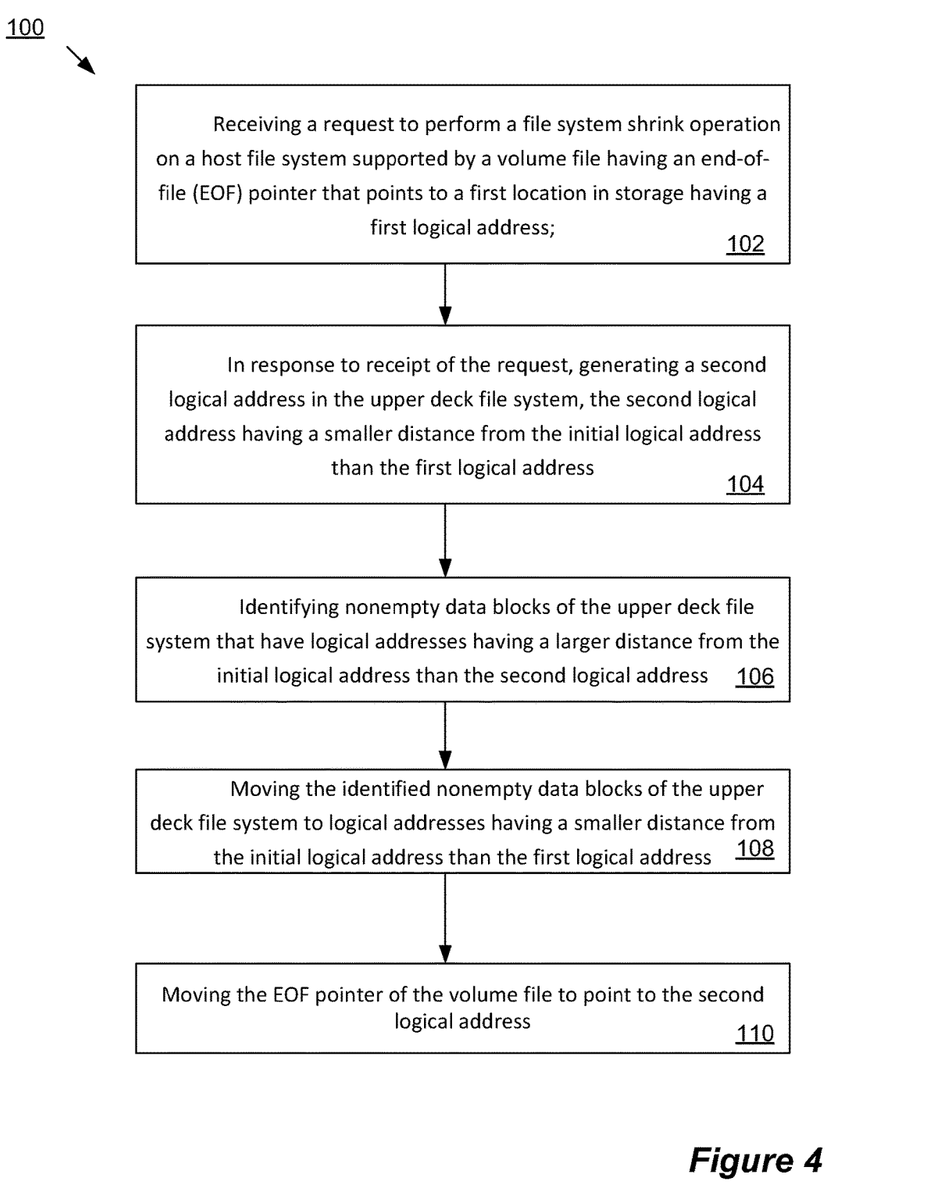
FIG. 4 is a flow chart illustrating an example method of carrying out the improved technique within the electronic environment shown in FIG. 1.

FIG. 4 illustrates a method 100 of managing storage space in an upper deck file system stored in the form of a volume file in an underlying lower deck file system, the volume file having a file address and an end-of-file (EOF) pointer having a first logical address that has a first offset from the file address, including steps 102, 104, 106, 108, and 110.

In step 102, a request to perform a file system shrink operation on the upper deck file system is received. In the discussion above, storage processor 16 receives request 40 and determines how many slices of data it needs to remove from upper deck file system 24. The request itself is, for directly provisioned file systems, manually generated by an administrator.

In step 104, a second logical address in the upper deck file system is generated in response to the receipt, the second logical address having a smaller distance from the initial logical address than the first logical address. Storage processor 16 computes this second logical address based on the amount of storage space needed to be removed from upper deck file system 24.

In step 106, nonempty data blocks of the upper deck file system that have logical addresses having a larger distance from the initial logical address than the second logical address are identified. In step 108, the identified nonempty data blocks of the upper deck file system to logical addresses having a smaller distance from the initial logical address than the first logical address are moved. Storage processor 16 is evacuating data in blocks outside the new, projected file to locations inside the file.

In step 110, the EOF pointer of the volume file is moved to point to the second logical address. Storage processor 16 has shrunk the volume file and freed data blocks in lower deck file system corresponding to blocks removed in upper deck file system 24.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion mainly referred to upper deck file system 24 as that being stored in the volume file in lower deck file system 28, the volume file may also store other data objects such as LUNs, vVols, and VHDs. Further, it should be understood that, in some arrangements, the volume file may take the form of a virtual machine disk (VMDK) for use with virtual machines that act as hosts.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. In a storage system including a set of storage devices and a storage processor, a method of managing storage space in an upper deck file system directly contained in a volume file in an underlying lower deck file system, the volume file having an initial logical address indicating a beginning of the volume file and a first terminal logical address indicating an end of the volume file, the method comprising:
    receiving a request to perform a file system shrink operation on the upper deck file system;
    in response to receipt of the request, generating a second terminal logical address of the volume file in the underlying lower deck file system, the second terminal logical address indicating a new end of the volume file in which the entire upper deck file system, including its data and metadata, is directly contained, the second terminal logical address having a smaller distance from the initial logical address than does the first terminal logical address;
    identifying nonempty data blocks of the volume file that have logical addresses having a larger distance from the initial logical address than does the second terminal logical address; and
    moving the identified nonempty data blocks of the volume file to logical addresses having a smaller distance from the initial logical address than does the second terminal logical address to respond to the file system shrink operation on the upper deck file system;
    wherein the upper deck file system is a host file system accessible to hosts for reading and writing files stored in the upper deck file system,
    wherein the volume file stores the upper deck file system, including the files in the upper deck file system,
    wherein the lower deck file system has an inode table including an inode that identifies the volume file as one of multiple files within the lower deck file system,
    wherein the storage processor includes memory, and
    wherein the method further comprises operating both the upper deck file system and the lower deck file system stored in the memory of the storage processor.

2. A method as in claim 1,
    wherein the request to perform the file system shrink operation includes a specification of an amount of storage space that is to be removed from the upper deck file system; and
    wherein the act of generating the second terminal logical address is based on the amount of storage space that is to be removed from the upper deck file system.

3. A method as in claim 2,
    wherein blocks are allocated to the lower deck file system within slices;
    wherein the amount of storage space that is to be removed from the upper deck file system is a whole number of slices;
    wherein the act of identifying the nonempty data blocks of the volume file that have logical addresses having a larger distance from the initial logical address than does the second terminal logical address includes:
        locating slices having logical addresses having a larger distance from the initial logical address than does the second terminal logical address that contain nonempty data blocks; and
    wherein the act of moving the identified nonempty data blocks of the volume file to logical addresses having a smaller distance from the initial logical address than does the second terminal logical address includes:
        locating slices having logical addresses having a smaller distance from the initial logical address than does the second terminal logical address that contain empty data blocks, and
        swapping the identified nonempty data blocks with the empty data blocks.

4. A method as in claim 3,
    wherein the act of identifying the nonempty data blocks of the volume file that have logical addresses having a larger distance from the initial logical address than does the second terminal logical address further includes:
        locating a nonempty metadata slice that has a logical address having a larger distance from the initial logical address than does the second terminal logical address that has nonempty metadata blocks; and
    wherein the act of moving the identified nonempty data blocks of the volume file to logical addresses having a smaller distance from the initial logical address than does the second terminal logical address further includes:
        locating an empty slice that has a logical address having a smaller distance from the initial logical address than does the second terminal logical address that has nonempty metadata blocks that has all empty data blocks, and
        swapping the nonempty metadata slice with the empty metadata slice.

5. A method as in claim 3,
    wherein each slice is a unit of storage provisioned from the set of storage devices to the lower deck file system;
    wherein the method further comprises:
        after moving the identified nonempty data blocks of the volume file to logical addresses having a smaller distance from the initial logical address than does the second terminal logical address, freeing a block in the volume file that has a logical address having a larger distance from the initial logical address than does the second terminal logical address.

6. A method as in claim 5, further comprising:
identifying a number of slices that contain all empty data blocks,
when the number of slices that contain all empty data blocks is greater than a threshold number of slices, marking those slices as being available to the storage pool, and
when the number of slices that contain all empty data blocks is less than the threshold number of slices, not marking those slices as being available to the storage pool.

7. A method as in claim 1,
wherein the act of receiving the request to perform the file system shrink operation includes:
obtaining a manual command from a system administrator to reduce the storage space of the upper deck file system by a particular amount.

8. A storage system constructed and arranged to manage storage space in an upper deck file system directly contained in a volume file in an underlying lower deck file system, the volume file having an initial logical address indicating a beginning of the volume file and a first terminal logical address indicating an end of the volume file, the storage system comprising:
a storage device; and
a storage processor, the storage processor including:
memory; and
a set of processors coupled to the memory to form control circuitry, the control circuitry constructed and arranged to:
receive a request to perform a file system shrink operation on the upper deck file system;
in response to receipt of the request, generate a second terminal logical address of the volume file in the underlying lower deck file system, the second terminal logical address indicating a new end of the volume file in which the entire upper deck file system is directly contained, the second terminal logical address having a smaller distance from the initial logical address than does the first terminal logical address;
identify nonempty data blocks of the volume file that have logical addresses having a larger distance from the initial logical address than does the second terminal logical address; and
move the identified nonempty data blocks of the volume file to logical addresses having a smaller distance from the initial logical address than does the second terminal logical address to respond to the file system shrink operation on the upper deck file system;
wherein the underlying lower deck file system includes a second volume file that directly contains an entire second upper deck file system, the second upper deck file system being distinct from the upper deck file system,
wherein the upper deck file system is a host file system accessible to hosts for reading and writing files stored in the upper deck file system,
wherein the volume file stores the upper deck file system including the files of the upper deck file system,
wherein the lower deck file system has an inode table including an inode that identifies the volume file as one of multiple files within the lower deck file system, and wherein the control circuitry is further constructed and arranged to operate both the upper deck file system and the lower deck file system stored in the memory of the storage processor.

9. A storage system as in claim 8,
wherein the request to perform the file system shrink operation includes a specification of an amount of storage space that is to be removed from the upper deck file system; and
wherein the control circuitry to generate the second terminal logical address includes:
producing the second terminal logical address based on the amount of storage space that is to be removed from the upper deck file system.

10. A storage system as in claim 9,
wherein blocks are allocated to the lower deck file system within slices;
wherein the amount of storage space that is to be removed from the upper deck file system is a whole number of slices;
wherein the control circuitry to identify the nonempty data blocks of the volume file that have logical addresses having a larger distance from the initial logical address than does the second terminal logical address includes:
locating slices having logical addresses having a larger distance from the initial logical address than does the second terminal logical address that contain nonempty data blocks; and
wherein the control circuitry to move the identified nonempty data blocks of the volume file to logical addresses having a smaller distance from the initial logical address than does the second terminal logical address includes:
locating slices having logical addresses having a smaller distance from the initial logical address than does the second terminal logical address that contain empty data blocks, and
swapping the identified nonempty data blocks with the empty data blocks.

11. A storage system as in claim 10,
wherein the control circuitry to identify the nonempty data blocks of the volume file that have logical addresses having a larger distance from the initial logical address than does the second terminal logical address further includes:
locating a nonempty metadata slice that has a logical address having a larger distance from the initial logical address than does the second terminal logical address that has nonempty metadata blocks; and
wherein the control circuitry to move the identified nonempty data blocks of the volume file to logical addresses having a smaller distance from the initial logical address than does the second terminal logical address further includes:
locating an empty slice that has a logical address having a smaller distance from the initial logical address than does the second terminal logical address that has nonempty metadata blocks that has all empty data blocks, and
swapping the nonempty metadata slice with the empty metadata slice.

12. A storage system as in claim 10,
wherein each slice is a unit of storage provisioned from the set of storage devices to the lower deck file system;
wherein the controlling circuitry is further constructed and arranged to:

after moving the identified nonempty data blocks of the volume file to logical addresses having a smaller distance from the initial logical address than does the second terminal logical address, free a block in the volume file that has a logical address having a larger distance from the initial logical address than does the second terminal logical address.

13. A storage system as in claim 12, wherein the controlling circuitry is further constructed and arranged to:
  identify a number of slices that contain all empty data blocks,
  when the number of slices that contain all empty data blocks is greater than a threshold number of slices, mark those slices as being available to the storage pool, and
  when the number of slices that contain all empty data blocks is less than the threshold number of slices, not mark those slices as being available to the storage pool.

14. A storage system as in claim 8,
  wherein the control circuitry to receive the request to perform the file system shrink operation includes:
    obtaining a manual command from a system administrator to reduce the storage space of the upper deck file system by a particular amount.

15. A computer program product having a non-transitory, computer-readable storage medium which stores instructions which, when executed by a storage processor, cause the storage processor to perform a method of managing storage space in an upper deck file system directly contained in a volume file in an underlying lower deck file system, the volume file having an initial logical address indicating a beginning of the volume file and a first terminal logical address indicating an end of the volume file, the method comprising:
  receiving a request to perform a file system shrink operation on the upper deck file system;
  in response to receipt of the request, generating a second terminal logical address of the volume file in the underlying lower deck file system, the second terminal logical address indicating a new end of the volume file in which the entire upper deck file system is directly contained, the second terminal logical address having a smaller distance from the initial logical address than does the first terminal logical address;
  identifying nonempty data blocks of the volume file that have logical addresses having a larger distance from the initial logical address than does the second terminal logical address; and
  moving the identified nonempty data blocks of the volume file to logical addresses having a smaller distance from the initial logical address than does the second terminal logical address to respond to the file system shrink operation on the upper deck file system,
  wherein the upper deck file system is a host file system accessible to hosts for reading and writing files stored in the upper deck file system,
  wherein the volume file stores the upper deck file system including the files of the upper deck file system,
  wherein the lower deck file system has an inode table including an inode that identifies the volume file as one of multiple files within the lower deck file system,
  wherein the storage processor includes memory, and
  wherein the method further comprises operating both the upper deck file system and the lower deck file system stored in the memory of the storage processor.

16. A computer program product as in claim 15,
  wherein the request to perform the file system shrink operation includes a specification of an amount of storage space that is to be removed from the upper deck file system; and
  wherein the act of generating the second terminal logical address is based on the amount of storage space that is to be removed from the upper deck file system.

17. A computer program product as in claim 16,
  wherein blocks are allocated to the lower deck file system within slices;
  wherein the amount of storage space that is to be removed from the upper deck file system is a whole number of slices;
  wherein the act of identifying the nonempty data blocks of the volume file that have logical addresses having a larger distance from the initial logical address than does the second terminal logical address includes:
    locating slices having logical addresses having a larger distance from the initial logical address than does the second terminal logical address that contain nonempty data blocks; and
  wherein the act of moving the identified nonempty data blocks of the volume file to logical addresses having a smaller distance from the initial logical address than does the second terminal logical address includes:
    locating slices having logical addresses having a smaller distance from the initial logical address than does the second terminal logical address that contain empty data blocks, and
    swapping the identified nonempty data blocks with the empty data blocks.

18. A computer program product as in claim 17,
  wherein the act of identifying the nonempty data blocks of the volume file that have logical addresses having a larger distance from the initial logical address than does the second terminal logical address further includes:
    locating a nonempty metadata slice that has a logical address having a larger distance from the initial logical address than does the second terminal logical address that has nonempty metadata blocks; and
  wherein the act of moving the identified nonempty data blocks of the volume file to logical addresses having a smaller distance from the initial logical address than does the second terminal logical address further includes:
    locating an empty slice that has a logical address having a smaller distance from the initial logical address than does the second terminal logical address that has nonempty metadata blocks that has all empty data blocks, and swapping the nonempty metadata slice with the empty metadata slice.

19. A computer program product as in claim 17,
  wherein each slice is a unit of storage provisioned from the set of storage devices to the lower deck file system;
  wherein the method further comprises:
    after moving the identified nonempty data blocks of the volume file to logical addresses having a smaller distance from the initial logical address than does the second terminal logical address, freeing a block in the volume file that has a logical address having a larger distance from the initial logical address than does the second terminal logical address.

20. A computer program product as in claim 19, wherein the method further comprises:
  identifying a number of slices that contain all empty data blocks, when the number of slices that contain all empty data blocks is greater than a threshold number of slices, marking those slices as being available to the storage pool, and when the number of slices that contain all empty data blocks is less than the threshold number of slices, not marking those slices as being available to the storage pool.

* * * * *

UNITED STATES PATENT AND TRADEMARK OFFICE
CERTIFICATE OF CORRECTION

PATENT NO. : 10,013,217 B1
APPLICATION NO. : 13/929879
DATED : July 3, 2018
INVENTOR(S) : Jean-Pierre Bono et al.

Page 1 of 1

It is certified that error appears in the above-identified patent and that said Letters Patent is hereby corrected as shown below:

On The Title Page

Item (54) and in the Specification, at Column 1 Line 8:
In the Title please change from "RESIDES" to --RESIDE--

Signed and Sealed this
Thirteenth Day of November, 2018

Andrei Iancu
*Director of the United States Patent and Trademark Office*